May 14, 1963          H. ULANET          3,089,935
THERMOSTATIC SWITCHES
Filed July 6, 1961
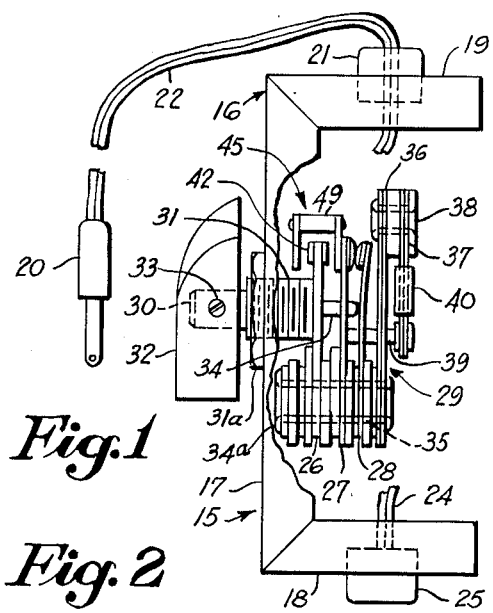
Fig.1
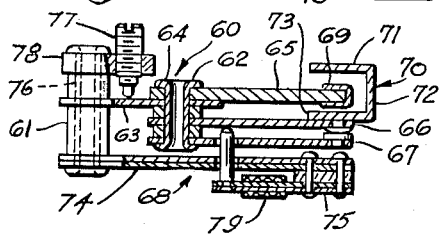
Fig.2
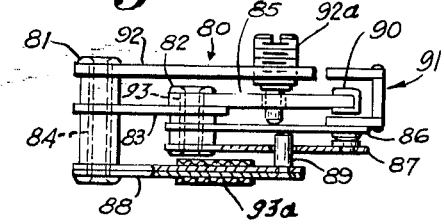
Fig.3
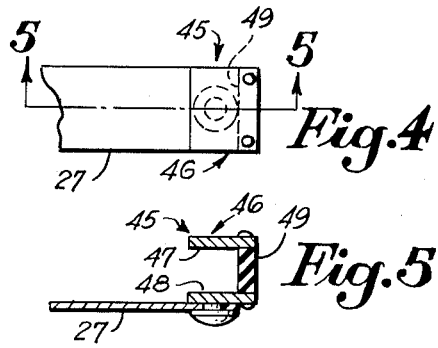
Fig.4
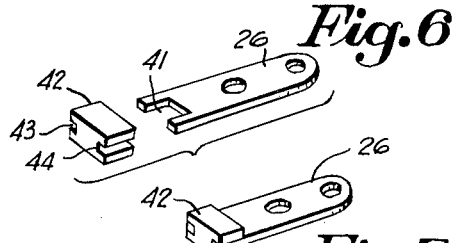
Fig.5
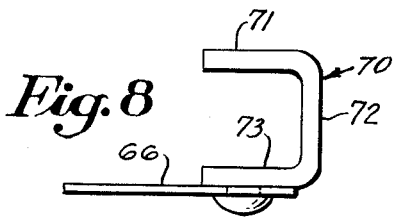
Fig.6
Fig.7
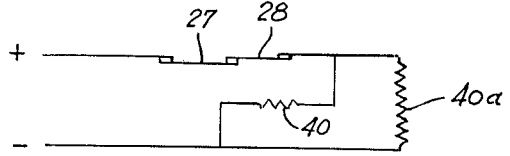
Fig.8
Fig.9
INVENTOR.
HERMAN ULANET
BY
Milo H. Hutchinson
ATTORNEY ated May 14, 1963

3,089,935
THERMOSTATIC SWITCHES
Herman Ulanet, 473 Richmond Ave., Maplewood, N.J.
Filed July 6, 1961, Ser. No. 122,187
4 Claims. (Cl. 200—122)

This is a continuation-in-part of patent application Ser. No. 778,448, covering Remote Automatic Temperature Controls for Electric Heating Devices, filed Dec. 5, 1958.

It is an object of this invention to provide remote automatic temperature controls in which spring contact members have magnetic snap action for longer life.

Another object is to provide temperature controls in which changes in ambient temperature automatically adjust the spring contact members for greater accuracy.

Other objects of the instant invention will become apparent in the course of the following specification.

In the attainment of the aforesaid objectives, subject controls are made in three embodiments. Each embodiment is constituted in part of a housing. In the housing are a pair of normally closed spring contact members, adjustment means for the contact points of the contact members, thermal responsive means for the contact members which opens and closes the contact points at predetermined temperatures, and magnetic snap action means for the contact points.

In the housing of the first embodiment are a rigid member, a pair of normally closed spring contact members, an ambient temperature compensating bimetallic element, and another bimetallic element. One end of the rigid member, the normally closed spring contact members, and the compensating element is fixed in spaced and insulated alignment to a rivet while one end of the other element is secured to the free end of the compensating element and inwardly directed therefrom in downwardly spaced alignment. On the free end of the other element is an insulator slidable through the compensating element and the most proximate contact member for operable engagement with the most remote contact member. Carried by the other element is an electric heating coil. In the free end of the rigid member is a magnet while on the free end of the most proximate contact member is an armature for the magnet. An adjustment screw through the top of the housing and the rigid member supports the members and compensating element in the housing and varies the pressure of the contact points.

The second embodiment differs from the first in that a post and a rivet are used rather than a rivet alone as in the first embodiment with the post and rivet held in spaced alignment by a resilient member. The second embodiment further differs from the first in that one end of the rigid member and the spring contact members is fixed to the rivet while the compensating element is secured at one end to the post with the members and element in spaced and insulated alignment. The second embodiment also varies from the first in that another rigid member is secured at one end to the post and then extended forwardly thereof in upwardly spaced alignment with the resilient member and with the adjustment screw through the second mentioned rigid member for operable engagement with the resilient member.

The third embodiment differs from the second in that no compensating bimetallic element is used, and in that the other rigid member is extended in upwardly spaced alignment with the first rigid member with the adjustment screw longitudinally adjustable through both rigid members for operable engagement with the most proximate contact member.

The invention will appear more clearly from the following detailed description when taken in conjunction with the accompanying drawings showing by way of example the preferred embodiments of the inventive concept.

In the drawings:

FIGURES 1, 4, 5, 6, and 7 show the first embodiment of the invention constructed in accordance with the principles of this invention and in which:

FIGURE 1 is a fragmentary side view of the control with the side and bottom members and electrical connections omitted for clarity;

FIGURE 4 is an enlarged fragmentary top view of the free end of the contact member most proximate to the rigid member, the contact member having the armature attached as shown in FIGURE 1;

FIGURE 5 is a sectional view along the line 5—5 of FIGURE 4;

FIGURE 6 is an enlarged and exploded perspective view of the rigid member and magnet shown in FIGURE 1; and FIGURE 7 is a view similar to FIGURE 6 but with the magnet and rigid member assembled.

FIGURES 2 and 8 show the second embodiment, and in which:

FIGURE 2 is a longitudinal sectional view of the control; and

FIGURE 8 is an enlarged fragmentary side view of the contact member and armature shown in FIGURE 2.

FIGURE 3 shows the third embodiment and is a longitudinal side view thereof in part section.

FIGURE 9 is a wiring diagram suitable for each of the three embodiments.

Referring now to the first embodiment of the controls shown in FIGURES 1, 4, 5, 6, and 7, reference numeral 15 indicates the control.

The control 15 is constituted in part of a housing 16 which has a top member 17, and end members 18 and 19. The housing 16 may have also side and bottom members secured along corresponding edges of the other members but omitted from the drawings for clarity. In the end member 18 is a receptacle 25 for connecting the control to an electrical load 40a (FIG. 9) to be heated while a plug 20 at one end of a dual strand cable 22 is provided for insertion in any known outlet of a power supply. An insulator 21 through the end member 19 leads the dual strand cable 22 from the power supply into the housing 16. The connections for the cable 22 inside the housing to the thermal responsive means 29 have been omitted in FIGURE 1 for clarity but are shown in the wiring diagram of FIGURE 9. The connections for the other dual strand cable 24 leading from the later described contact members 27 and 28 as well as the connections for the electric heating coil 40 also have been omitted from FIGURE 1 but are shown in FIGURE 9.

Within the housing 16 is a rigid member 26, a pair of normally closed spring contact members 27 and 28, an ambient temperature compensating element 36, and another bimetallic element 37. One end of each member 26, 27, and 28 and the compensating bimetallic element 36 is fixed to a hollow rivet 34a around which is an insulating sleeve 35. The rivet assembly is held in the housing by an externally and internally threaded stud 31. A nut 31a secures the stud to the top member of the housing while a shaft 30 with insulating tip 34, longitudinally adjustable in the stud as well as through registered openings in the rigid member 26 and most proximate contact member 27, is in operable engagement with the most remote contact member 28. A knob 32 keyed to the shaft 30 by any suitable means 33 varies the pressure of the contact points as desired. Spacers intermediate the fixed ends of the members 26, 27, and 28 and element 36 are used to maintain the members and element in spaced and insulated alignment as shown in FIGURE 1. At the fixed ends of the contact members 27 and 28, connectors may be provided by securing one end of a connector to the fixed end of each contact member.

The ambient temperature compensating bimetallic element 36 and the other bimetallic element 37 constitute the thermal responsive means 29. One end of the element 37 is fixed by any suitable means 38 to the free end of the compensating element 36 and is rearwardly directed therefrom in downwardly spaced alignment. An insulator 39 is fixed to the free end of the element 37 and is slidably inserted through registered openings in the compensating element 36 and the most proximate contact member 28 for operable engagement with the most remote contact member 27.

Carried by the element 37 is an electric heating coil 40 which is connected in the circuit as shown in FIGURE 9.

In the free end of the rigid member 26 (FIG. 6) is a slot 41 and slidable in the slot is a magnet 42 (FIGS. 1, 6, and 7). The runways 43 and 44 (FIG. 6) in the magnet 42 provide a means for the removable insertion of the magnet.

On the free end of the contact member 27 is an armature 45 of U-shape. The armature 45 is formed from two spaced members 47 and 48 (FIG. 5) made from magnetic conductive material, which are held together at corresponding ends by a member 49 of non-magnetic conductive material. The armature 45 is fastened on one side 48, as shown in (FIG. 5), to the free end of the most proximate contact member 27 by any known means with the magnet 42 (FIG. 1) protruding through the open end of the U-shaped armature.

Referring now to the second embodiment of the control shown in FIGURES 2 and 8, reference numeral 60 indicates the control removed from the housing and with the electrical connections omitted for clarity.

The control 60 differs from the control of the previously illustrated and described first embodiment by using a post 61 and a rivet 62 which are held together in spaced parallel arrangement by a resilient member 63. Also in the second embodiment, the rivet 62 supports the rigid member 65 and the spring contact members 66 and 67 while the compensating element 74 is fixed at one end to the post 61 and extends forwardly thereof in downwardly spaced alignment with the rigid and contact members. The control 60 further differs from that of the first embodiment in respect to the armature as later shown.

The top of the post 61 is fixed in the top member of the housing by any known means and is downwardly directed into the housing. In spaced parallel arrangement with the post 61 is the hollow rivet 62. The post and rivet are held adjacent the top of each by a resilient member 63. Around the rivet 62 is an insulator sleeve 64 and around the post 61 is a similar sleeve 76. The rigid member 65 is secured at one end adjacent the top of the rivet 62 and extends forwardly thereof as illustrated. One end of each spring contact member 66 and 67 is also fixed to the rivet 62 in downwardly spaced and insulated alignment with each other and the rigid member. Any suitable spacers of insulating material may be used to separate the rigid and contact members as illustrated in FIGURE 2.

The thermal responsive means 68 is substantially the same as the corresponding component of the previously described first embodiment with the exception that it is fixed at one end to the post 61 and extends forwardly thereof in downwardly directed alignment with the previously mentioned rigid member 65 and contact members 66 and 67. As in the first embodiment, another bimetallic element 75 is secured by any known means to the free end of the compensating element 74 and then extended rearwardly of the fixed end and in downwardly spaced alignment with the members and compensating element.

The magnet 69 is the same as that illustrated and described in the first embodiment. However, the armature 70 differs from that of the first embodiment in that it is formed from all magnetic conductive members 71, 72, and 73.

The adjustment screw 77 also differs from that of the first embodiment in that it is threaded through another rigid member 78 which is in upwardly spaced alignment with the resilient member 63 for operable engagement with the resilient member.

The electric heating coil 79 is the same as the electric heating coil of the first embodiment.

Referring now to the third embodiment of the control shown in FIGURE 3, reference numeral 80 indicates the control which has been removed from the housing and the electrical connections omitted for clarity.

The control 89 differs from that of the second embodiment in that there is no ambient temperature compensating bimetallic element; in the location of the electric heating coil; and in the position of the adjustment screw. Such variations will be apparent in the following description.

The top of the post 81 is fixed in the top of the housing by any suitable means not shown in the drawing, the post being downwardly directed in the housing. A hollow rivet 82 is held in spaced parallel arrangement with the post 81 by a resilient member 83. An insulator sleeve 84 is placed around the post 81 and a like sleeve 93 around the hollow rivet 82. A rigid member 85 is secured at one end adjacent the top of the rivet 82. Also, a pair of spring contact members 86 and 87 are fixed at one end to the rivet 82 in downwardly spaced and insulated alignment with the rigid member 85. Any known insulating spacers may be used for insulating the rigid and contact members from each other.

A unitary bimetallic element 88 is fixed at one end to the post 81 and extends forwardly thereof in downwardly spaced alignment with the lowermost contact member 87, which, in turn, is aligned with the uppermost contact member 86 and the rigid member 85. On the free end of the bimetallic element 88 is an insulator 89 slidably inserted through the most proximate contact member 87 for operable engagement with the most remote contact member 86.

Carried by the element 88 is the electric heating coil 93a.

In the free end of the rigid member 85 is the magnet 90 like that of each of the previously illustrated and described embodiments. While the armature 91 through the open end of which the magnet 90 protrudes is illustrated as the same as that of the first embodiment, either the armature of the first or second embodiment could be used.

Unlike the second embodiment, a second rigid member 92 is fixed at one end adjacent the top of the post 81 and extends forwardly thereof in upwardly spaced alignment with the first mentioned rigid member 85. Longitudinally adjustable through both rigid members is an adjustment screw 92a in operable engagement with the most proximate contact member 86 and, of course, is insulated therefrom. By this construction a very much finer adjustment of the contact points is possible than in the case of the adjustment means of the second embodiment.

While only three embodiments of subject control have been illustrated and described, other embodiments are possible within the scope of the appended claims.

What is claimed is:

1. A thermostatic switch in combination with an electric power supply, the switch comprising a housing, the housing having at least a top member, at least one rigid member and a pair of normally closed spring contact members and thermal responsive means for the housing, means fixing corresponding ends of the rigid and contact members and thermal responsive means in the housing, the rigid and contact members being downwardly directed from the top member in the order named and further being forwardly directed from the fixed ends in spaced and insulated alignment, one rigid member having a slot formed in the free end thereof, a magnet slidably disposed in the slot, an armature for the magnet disposed on the free end of the most proximate contact member, an electric heating coil carried by the thermal responsive means, means connecting the contact members in series with the power supply and electrical load, means connecting the heating coil across the power supply when the contact members are closed, and contact adjustment means for the contact members.

2. A thermostatic switch according to claim 1 in which the thermal responsive means comprises an ambient temperature compensating bimetallic element and a second bimetallic element, means securing one end of the second mentioned element to the free end of the compensating element, the second mentioned element further being directed toward the fixed end of the compensating element and in downwardly spaced alignment therewith, an insulator disposed on the free end of the second mentioned element and slidable through the compensating element and the most proximate contact member for operable engagement with the most remote contact member, and an electric heating coil carried by the second mentioned element; in which the contact adjustment means comprises an adjustment screw with inwardly directed insulator tip longitudinally adjustable through the top and rigid members and in operable engagement with the most remote contact member; and in which the armature for the magnet comprises a U-shaped member, the U-shaped member comprising two spaced members of magnetic conductive material, a non-magnetic conductive member disposed intermediate the corresponding ends of the members of magnetic conductive material, and means securing the U-shaped member to the contact member most proximate to the rigid member with the magnet protruding through the open end.

3. A thermostatic switch according to claim 1 in which the switch comprises a post fixed at one end to the top member and extended downwardly therefrom, a hollow rivet for the housing, a resilient member disposed intermediate the post and rivet and maintaining the same in spaced parallel arrangement, a rigid member and a pair of spring contact members fixed at corresponding ends to the rivet in the order named and in downwardly spaced and insulated alignment, an ambient temperature compensating bimetallic element fixed at one end to the post and extended forwardly thereof in downwardly spaced alignment with the lowermost contact member, a second bimetallic element fixed at one end to the free end of the compensating element, the second mentioned element being directed toward the post in downwardly spaced alignment with the compensating element, an insulator disposed on the free end of the second mentioned element, the insulator being slidable through the compensating element and most proximate contact member and in operable engagement with the most remote contact member, an electric heating coil carried by the second mentioned element; in which a second rigid member is fixed at one end to the post in upwardly spaced alignment with the resilient member, an adjustment screw with insulated tip longitudinally adjustable through the second mentioned rigid member in operable engagement with the resilient member; and in which the armature for the magnet comprises a U-shaped member of magnetic conductive material, and means securing the U-shaped member to the contact member most proximate to the first mentioned rigid member with the magnet protruding through the open end thereof.

4. A thermostatic switch according to claim 1 in which the switch comprises a post disposed in the housing, means securing one end of the post to the top member, a hollow rivet for the housing, a resilient member disposed intermediate the post and rivet and maintaining the same in spaced parallel arrangement, a rigid member and a pair of spring contact members fixed at corresponding ends to the rivet in spaced and insulated alignment in the order named relative to the top member, a bimetallic element fixed at one end to the post and extended forwardly thereof in downwardly spaced alignment with the contact members, an insulator disposed on the free end of the element, the insulator being slidable through the most proximate contact member and in operable engagement with the most remote contact member, and an electric heating coil carried by the element; and in which a second rigid member is fixed at one end to the post in upwardly spaced alignment with the first mentioned rigid member, and an adjustment screw longitudinally adjustable through the first and second mentioned rigid members for operable engagement with the most proximate contact member.

References Cited in the file of this patent
UNITED STATES PATENTS

| 2,451,535 | Clark | Oct. 19, 1948 |
| 2,791,662 | Mertler | May 7, 1957 |

FOREIGN PATENTS

| 620,757 | Canada | May 23, 1961 |